United States Patent
Duan et al.

(10) Patent No.: US 9,665,608 B2
(45) Date of Patent: May 30, 2017

(54) PARALLELIZATION OF DATA PROCESSING

(71) Applicant: INTERNATIONAL BUSINESS MACHINES CORPORATION, Armonk, NY (US)

(72) Inventors: Ning Duan, Beijing (CN); Wei Huang, Beijing (CN); Peng Ji, Beijing (CN); Yi Qi, Beijing (CN); Qi Zhang, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 14/299,042

(22) Filed: Jun. 9, 2014

(65) Prior Publication Data

US 2015/0006468 A1  Jan. 1, 2015

(30) Foreign Application Priority Data

Jun. 27, 2013  (CN) .......................... 2013 1 0261903

(51) Int. Cl.
*G06F 17/30* (2006.01)
(52) U.S. Cl.
CPC ............... *G06F 17/30345* (2013.01)
(58) Field of Classification Search
USPC ....................................... 707/602
See application file for complete search history.

(56) References Cited

U.S. PATENT DOCUMENTS

| | | | | |
|---|---|---|---|---|
| 5,928,334 A * | 7/1999 | Mandyam | ................. | G06F 9/52 709/248 |
| 5,956,704 A * | 9/1999 | Gautam | ............ | G06F 17/30377 |
| 6,850,947 B1 | 2/2005 | Chung et al. | | |
| 7,917,379 B1 * | 3/2011 | Burkhardt | .............. | G06Q 10/06 705/7.12 |
| 2007/0143759 A1 | 6/2007 | Ozgur et al. | | |
| 2007/0288526 A1 * | 12/2007 | Mankad | .............. | G06F 11/1662 |
| 2007/0294319 A1 * | 12/2007 | Mankad | .............. | G06F 11/1662 |
| 2009/0083306 A1 * | 3/2009 | Sichi | ..................... | G06Q 10/00 |
| 2013/0179394 A1 * | 7/2013 | Simitsis | ............ | G06F 17/30227 707/602 |
| 2015/0006468 A1 * | 1/2015 | Duan | ................ | G06F 17/30345 707/602 |

OTHER PUBLICATIONS

Tu et al., "An Intelligent ETL Workflow Framework Based on Data Partition," Intelligent Computing and Intelligent Systems (ICIS), 2010 IEEE International Conference on Oct. 29-31, 2010,vol. 3, pp. 358-363.

* cited by examiner

*Primary Examiner* — Kim Nguyen
(74) *Attorney, Agent, or Firm* — Rabin Bhattacharya

(57) ABSTRACT

A method and apparatus for parallelization of data processing. The method including: parsing a data processing flow to split a write table sequence for the data processing flow; generating a plurality of instances of the data processing flow based at least in part on the split write table sequence; and scheduling the plurality of instances for parallelization of data processing.

12 Claims, 5 Drawing Sheets

PARALLELIZATION OF DATA PROCESSING

CROSS-REFERENCE TO RELATED APPLICATION

This application claims priority under 35 U.S.C. §119 from Chinese Patent Application No. 201310261903.0 filed Jun. 27, 2013, the entire contents of which are incorporated herein by reference.

BACKGROUND OF THE INVENTION

1. Field of the Invention

The present invention relates to a computer system, and more specifically, to a method and apparatus for parallelization of data processing.

2. Description of Related Art

Database Partition Feature (DPF) function can partition a database (DB) across multiple servers to improve the management of a large database, and is beneficial to solve the multi-tenant problem. For example, in a connected vehicle platform, different company's data is often stored on different database partitions. When a database management command is called and run on a partitioned database, it can be specified with respect to which partitions the command is run, whereby the database and resources can be more flexibly managed.

On the other hand, data processing technologies such as data Extraction, Transformation and Loading (ETL) have been widely used in the system development process. For example, ETL can extract data in distributed and heterogeneous data sources, then clean, transform, integrate it, and finally load it into a database to become the basis for online analytical processing and data mining. A recent development in ETL tool is the implementation of parallel processing, which can improve overall performance of ETL processing when dealing with large volumes of data. Big data analysis and application need high performance ETL, whereby it is desired to improve traditional ETL tools and processing to better meet with the application requirements.

SUMMARY OF THE INVENTION

According to a first aspect of the present invention, a method for parallelization of data processing is provided. The method includes: parsing a data processing flow to split a write table sequence for the data processing flow; generating a plurality instances of the data processing flow based at least in part on the split write table sequence; and scheduling the plurality of instances for parallelization of data processing.

According to a second aspect of the present invention, an apparatus for parallelization of data processing is provided. The apparatus includes: a memory; a processor device communicatively coupled to the memory; and a module configured for parallelization of data processing coupled to the memory and the processor device to carry out the steps of a method including: parsing a data processing flow to split a write table sequence for the data processing flow; generating a plurality of instances of the data processing flow based at least in part on the split write table sequence; and scheduling the plurality of instances for parallelization of data processing.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Figure 1:
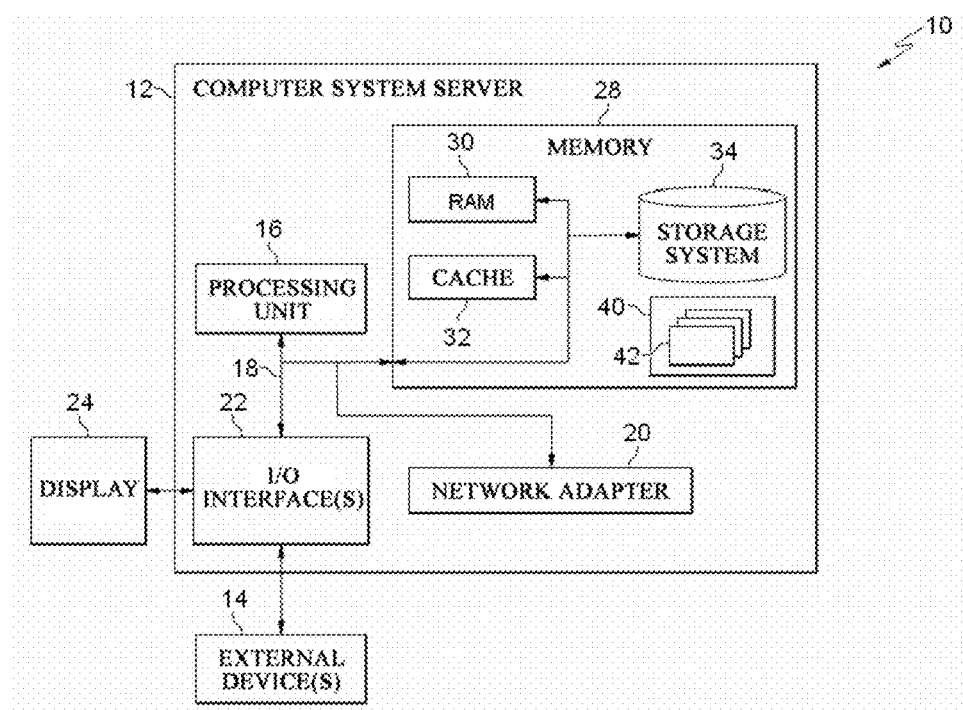
FIG. 1 shows an exemplary computer system 100/server 12 which is applicable to implement an embodiment of the present invention.

Some preferable embodiments will be described in more detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

The ETL which has been widely used in the system development process still has deficiencies. For example, ETL related big data processing leads to long data transaction in the database, and ETL involves lots of serial read/write operations. On the other hand, the traditional ETL process is very time-consuming when large volumes of data needs to be handled, and ETL parallelization usually cannot benefit from the advantage of the DB partition feature. Considering that data tables operated by the ETL usually show aggregated feature and can be executed by segment, there is proposed a solution for parallelization of data processing according to an exemplary embodiment of the invention, which can significantly enhance efficiency of data processing such as ETL by using such features as ETL segment execute tables. In addition, the proposed solution can also combine DPF and parallelization of data processing (such as ETL parallelization) together to enhance the data processing efficiency.

Figure 2:
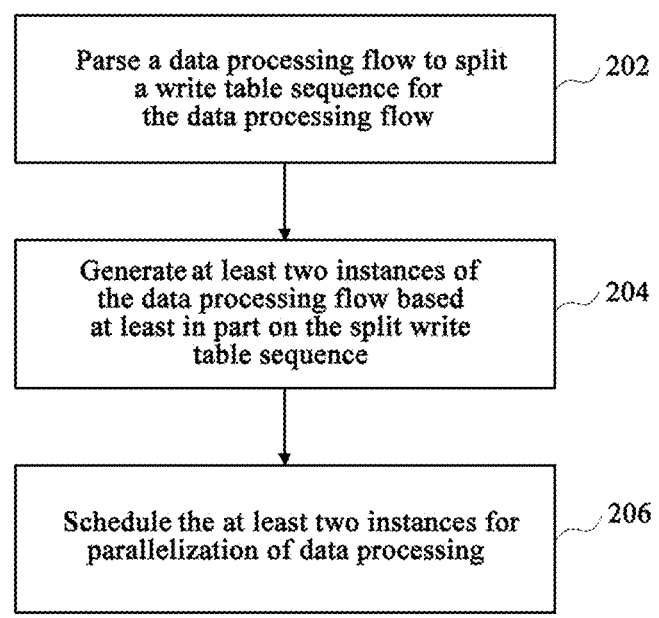
FIG. 2 is a flow chart illustrating a method for parallelization of data processing, according to an embodiment of the present invention.

With reference now to FIG. 2, which is a flow chart illustrating a method for parallelization of data processing, according to an embodiment of the present invention. As to data processing flow, as shown in block 202 in FIG. 2, the data processing flow can be parsed to split a write table sequence for the data processing flow. For the data processing flow reading/writing database tables, the write table sequence indicates database tables to be written by the data processing flow. For example, the data processing mentioned herein can include operations like data extraction, transformation and loading. Accordingly, the data processing flow can include ETL flow, ETL thread or any other appropriate data processing task or subtask. According to an embodiment of the present invention, the write table sequence can be split according to an assemble structure of the write table sequence of the data processing flow. For example, the assemble structure can be regarded as the following structural feature reflected by the write table sequence: individual database tables indicated by the write table sequence can be gathered or divided into different assembles. In general, members in the same assemble usually are gathered together because of a specific association. Of course, a corresponding assemble criterion also can be designated according to specific requirements. Thus, the write table sequence of the data processing flow can be split into at least two segments, and according to an embodiment of the present invention, neighboring segments indicate different database tables. For example, for a specific data processing flow, a write table sequence T1 T2 T1 T2 T3 T4 T4 T3 T8 T9 can be generated, wherein the symbol "T" indicates the database table. According to the assemble structure of the write table sequence, it can be split into three segments, and the split write table sequence can be expressed as: T1 T2 T1 T2 ∥ T3 T4 T4 T3 ∥ T8 T9, wherein the symbol "∥" represents splitting the write table sequence. As can be seen, in the split three segments, two neighboring segments indicate different database tables respectively. For example, the first segment "T1 T2 T1 T2" is directed to database tables T1 and T2, the second segment "T3 T4 T4 T3" is directed to database tables T3 and T4, and the third segment "T8 T9" is directed to database tables T8 and T9. It should be understood that the write table sequence can be split according to any appropriate assemble algorithm existed, in developing or likely arising in the future.

As shown in block 204 in FIG. 2, at least two instances of the data processing flow can be generated based at least in part on the split write table sequence. According to an embodiment of the present invention, the at least two instances can perform write operations on different database tables at the same time. For example, according to the segmentation result of the write table sequence T1 T2 T1 T2 T3 T4 T4 T3 T8 T9, three data processing instances (such as three ETL threads) can be generated, for example, expressed as K1, K2 and K3, respectively, wherein when K1 performs write operations on the database table with respect to segment "T1 T2 T1 T2", K2 performs write operations on the database table with respect to segment "T3 T4 T4 T3" and K3 performs write operations on the database table with respect to segment "T8 T9". The purpose of this design is to avoid the case where the database table is locked because the parallelized data processing instances simultaneously perform write table operations on the same database table. Accordingly, for such write table sequence, as shown in block 206 in FIG. 2, the at least two instances can be scheduled for parallelized data processing. According to an embodiment of the present invention, scheduling the at least two instances for parallelized data processing can include: using pipeline technology to schedule the at least two instances. For example, in a situation where the pipeline technology is used, since parallelized data processing instances K1, K2 and K3 can perform parallel write table operations with respect to different segments (such as write table sequence segments "T1 T2 T1 T2", "T3 T4 T4 T3" and "T8 T9" respectively), write operations can be performed on different database tables at the same time, which can not only avoid thread conflicts, but also significantly improve the efficiency of data processing.

It should be understood that the number of instances generated with respect to the write table sequence is not necessarily completely identical with the number of segments of the write table sequence. This will be illustrated by the following example. Assuming that the write table sequence corresponding to the data processing flow is: T1 T2 T1 T1 T3 T1 T4 T5, in order to split the write table sequence, the write table sequence can be traversed forward to make statistics of a database table which appears most frequently (such as T1 which appears four times), then the write table sequence can be split according to this database table (such as T1), and if there are multiple such database tables, they can be grouped together. Thus, the write table sequence split into six segments can be obtained as: T1 ∥ T2 ∥ T1 T1 ∥ T3 ∥ T1 ∥ T4 T5, so that it can be guaranteed that there is no duplicate database table in two neighboring segments. According to the split sequence above, two instances can be parallelized to perform data processing operations on the write table sequence (for example, a first ETL thread performing operations on a first segment "T1", and a second ETL thread performing operations on second to sixth segments "T2 || T1 T1 || T3 || T1 || T4 T5"), thus avoiding thread conflicts due to locking when parallelized data processing instances perform write table operations. According to an embodiment of the present invention, when there can be multiple solutions of generating data processing instances according to the segmentation result of the write table sequence, a solution which can generate more instances can be used in case that it can be guaranteed there is no write table conflict between instances, so as to combine parallelized pipeline technology to further enhance data processing efficiency and performance.

Figure 3:
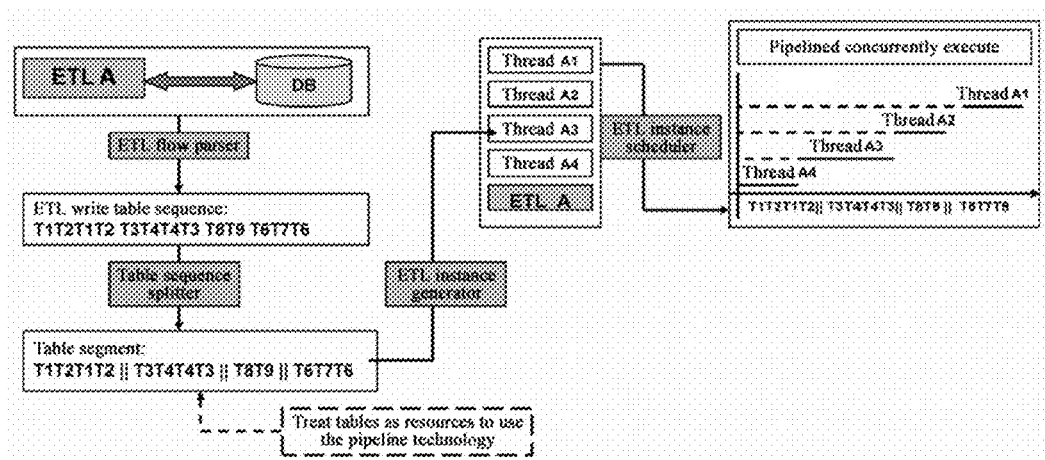
FIG. 3 is a schematic diagram illustrating an ETL flow parsing process, according to an embodiment of the present invention.

FIG. 3 is a schematic diagram illustrating ETL flow parsing process according to an embodiment of the present invention. As shown in FIG. 3, ETL flow A can access to database DB. Through parsing the ETL flow by an ETL flow parser, a corresponding ETL write table sequence, such as T1 T2 T1 T2 T3 T4 T4 T3 T8 T9 T6 T7 T6 shown in FIG. 3, can be generated. According to the assemble structure of the write table sequence, the write table sequence can be split by a table sequence splitter into segments, such as T1 T2 T1 T2 || T3 T4 T4 T3 || T8 T9 || T6 T7 T6 shown in FIG. 3. In the case of parallelized ETL processes, a corresponding number of ETL instances can be generated by an ETL instance generator according to the segmentation result of the table sequence, such as thread A1, thread A2, thread A3 and thread A4 shown in FIG. 3. According to an embodiment of the present invention, database tables indicated by the write table sequence can be processed as data resources, so as to use the pipeline technology. For example, individual ETL instances can be scheduled by an ETL instance scheduler to in parallel execute individual ETL instances in a pipeline way. As shown in FIG. 3, thread A1, thread A2, thread A3 and thread A4 can be successively scheduled in a pipeline way, so that when thread A1 performs write table operation on the table sequence segment "T6 T7 T6", thread A2, thread A3 and thread A4 can perform write table operations with respect to table sequence segments "T8 T9", "T3 T4 T4 T3" and "T1 T2 T1 T2" respectively, thereby avoiding thread conflict caused by write table lock.

Figure 4:
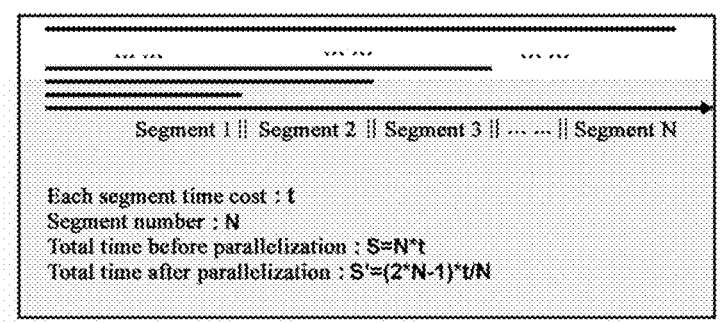
FIG. 4 is a schematic diagram illustrating time consuming of data processing, according to an embodiment of the present invention.

FIG. 4 is a schematic diagram illustrating time consuming of data processing according to an exemplary embodiment of the present invention. The schematic diagram intends to compare, with respect to the same write table sequence, time consumed for traditional data processing with time consumed for parallelization of data processing according to an embodiment. As shown in FIG. 4, assuming that the write table sequence can be split into N segments, the time consumed for original thread L to process each segment in case of the traditional data processing is t, then the total time consumed for the original thread L processing the write table sequence is S=N*t. In contrast, according to an embodiment of the invention, for the write table sequence split into N segments, multiple parallelized instances (threads) can be generated to process relevant operations of the original thread L. For the sake of simplicity, assuming that N new threads are generated for the original thread L to share the workload thereof, then the processing efficiency of each new thread will be N times that of the original thread L, and accordingly, the time consumed for each new thread to process each segment is t/N. In case that the pipeline technology is used to perform N parallelized new threads (for example, one new thread is scheduled every t/N), the total time consumed for completing the processing of the write table sequence is S'=(2*N−1)1/N. Thus it can be seen that the solution of parallelization of data processing according to an embodiment of the present invention can significantly improve the operation efficiency.

Figure 5:
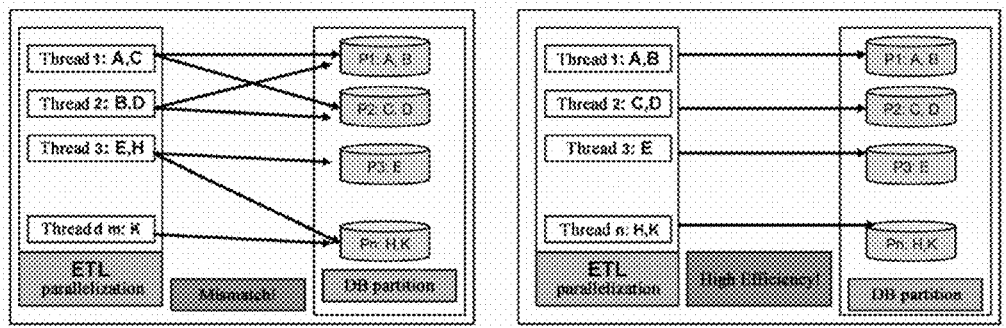
FIG. 5 schematically illustrates the relationship between ETL parallelization and database partition, according to an embodiment of the present invention.

FIG. 5 schematically illustrates the relationship between ETL parallelization and DB partition according to an embodiment of the present invention. In the traditional data processing, processing such as ETL needs to read/write lots of database tables, and ETL threads often cause conflict when accessing DB, whereby big data access will make data traction very long and have negative impacts on the ETL performance. In the left part of FIG. 5 is shown m ETL parallelized threads, thread 1, thread 2 . . . thread m, which will access n DB partitions P1, P2 . . . Pn, respectively. The fact that the lower DB partitions are transparent to the upper ETL flow while ETL parallelization processing and the data in these DB partitions are mismatched, causes the low efficiency of ETL processing. However, if as shown in the right part of FIG. 5, n ETL parallelization threads, thread 1, thread 2 . . . thread n access n DB partitions P1, P2 . . . Pn, respectively, and each thread only needs to access a particular DB partition, then the high efficiency in ETL processing can be achieved.

Therefore, in order to improve system performance, the solution according to an embodiment of the present invention also considers combining parallelization of data processing with DPF, to further enhance the efficiency of data processing. In this case, the method described in conjunction with FIG. 2 can further include: scanning database partitions; and dispatching a plurality of data processing subtasks of a data processing task to the database partitions based at least in part on the scanning result. For example, the data processing task can include data processing instances or threads (such as ETL instances or threads). According to an embodiment of the present invention, scanning the database partitions can include: scanning a database partition key table to obtain database partition keys; and mapping the database partitions and the database partition keys to learn the number of the database partitions. According to an embodiment of the present invention, dispatching the plurality of data processing subtasks to the database partitions can include: parallelizing the data processing task into the plurality of data processing subtasks based at least in part on the number of the database partitions; dispatching the plurality of data processing subtasks to corresponding database partitions; and executing the plurality of data processing subtasks in parallel. For example, dispatching the plurality of data processing subtasks to the corresponding database partitions can make each data processing subtask only need to operate the corresponding database partition thereof. In particular, in an embodiment of the present invention where the parallelization of data processing is combined with DPF, the data processing flow described in FIG. 2 can include any one of the plurality of data processing subtasks executed in parallel.

Figure 6:
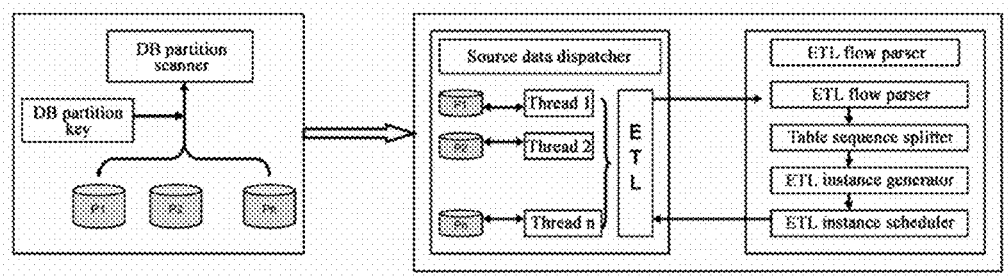
FIG. 6 is a schematic diagram illustrating the combination of DPF and ETL parallelization, according to an embodiment of the present invention.

FIG. 6 is a schematic diagram illustrating the combination of DPF and ETL parallelization according to an embodiment of the present invention. Although it is described on the whole that DPF advantage is introduced into the process of scheduling parallelized ETL threads using the pipeline technology, it can be understood that the process of using DPF to parallelize data processing (such as ETL task or thread) and the process of scheduling data processing (such as ETL instance or thread) in a pipeline way by splitting the write table sequence, can be performed separately or in combination according to an embodiment of the present invention. As shown in FIG. 6, DB partitions P1, P2 . . . Pn can be learned from the operation of the DB partition scanner, and accordingly a source data dispatcher can dispatch n threads to respective matching DB partitions. The pipeline scheduling of parallelized ETL threads can be implemented for each thread by applying the method described in combination with FIG. 2. For example, as shown in FIG. 6, the ETL flow parsing process can use an ETL flow parser, a table sequence splitter, an ETL instance generator and an ETL instance scheduler to perform corresponding operations on thread 1, thread 2 . . . thread n, whereby reasonable scheduling of parallelized ETL threads can be implemented to improve the execution efficiency of ETL. The process of using DPF is described below in combination with FIG. 7.

Figure 7:
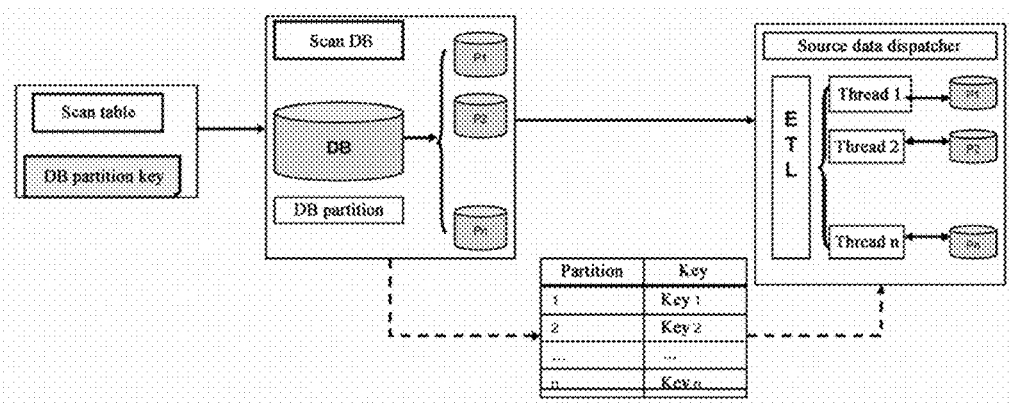
FIG. 7 is a schematic diagram illustrating enhancing ETL performance using database partition information, according to an embodiment of the present invention.

FIG. 7 is a schematic diagram illustrating enhancing ETL performance using database partition information according to an embodiment of the present invention. The process of using the database partition information can be related to DB scanning and source data dispatching. According to an embodiment of the present invention, DB partition keys can be got by scanning a DB partition key table, then DB partitions (such as P1, P2 . . . Pn shown in FIG. 7) and DB partition keys can be mapped (respective partition keys corresponding to the DB partitions respectively as shown in FIG. 7) by scanning the DB, to obtain the number of DB partitions. In source data dispatching, an ETL task can be parallelized into a plurality of subtasks according to the number of DB partitions, and each ETL subtask can be dispatched to a corresponding DB partition, so as to execute these ETL subtasks in parallel. For example, the ETL subtask can include ETL thread or ETL flow, etc. In particular, FIG. 7 shows n ETL threads corresponding to n DB partitions. In this way, data in respective DB partitions and corresponding parallelized ETL threads form matching relationships, and it is possible for the same ETL thread to perform the required data operations by only accessing the corresponding DB partition thereof, thereby improving the ETL operation performance and database access efficiency.

Figure 8:
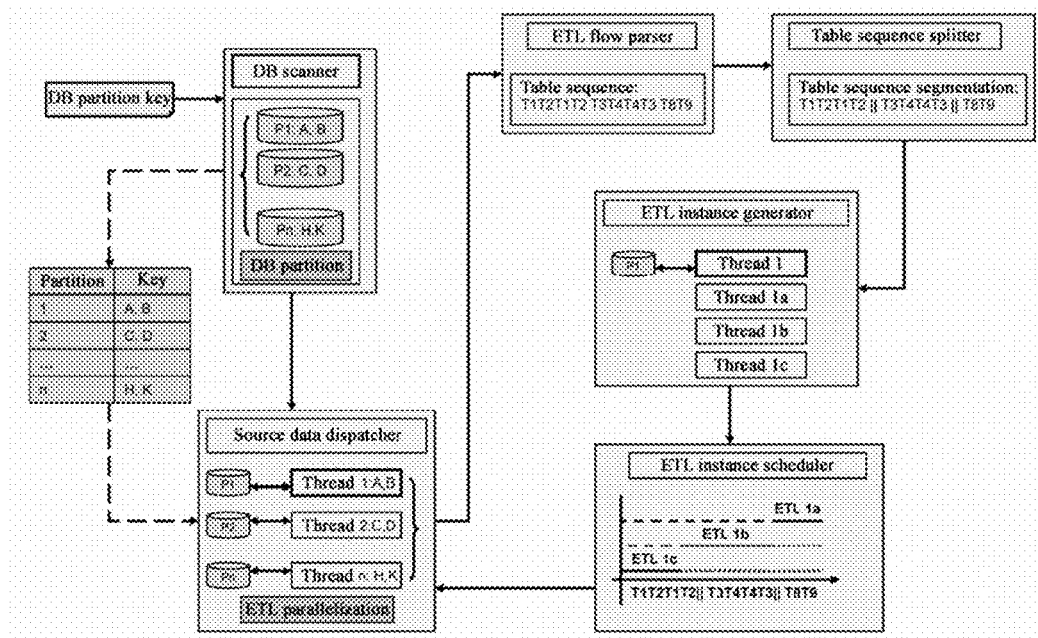
FIG. 8 is a schematic diagram illustrating parallelizing DB ETL by using DPF, according to an embodiment of the present invention.

FIG. 8 is a schematic diagram illustrating parallelizing DB ETL by using DPF, according to an embodiment of the present invention. The schematic diagram illustrates an integration process of dual ETL parallelization, according to an embodiment of the present invention. As shown in FIG. 8, since this process uses the DB partition information to enhance the ETL performance, as to a specific ETL task, the mapping between a DB partition key table and DB partitions can be implemented by scanning the DB partition key table and the DB partitions. For example, partition P1 corresponds to key A and key B, partition P2 corresponds to key C and key D, and by analogy, partition Pn corresponds to key H and key K. According to the mapping relationship, the specific ETL task can be parallelized into n subtasks (such as ETL flows or threads) performing operations on n DB partitions, respectively. According to an embodiment of the present invention, for any one of the subtasks, the pipeline technology can be introduced by further considering the features of ETL segment execute write table sequence. For example, through the ETL flow parsing operation, a corresponding write table sequence can be generated for thread 1 which performs operations on partition P1 in FIG. 8, and can be split into three segments, such as T1 T2 T1 T2 ∥ T3 T4 T4 T3 ∥ T8 T9. The ETL instance generator can parallelize three corresponding instances (such as thread 1a, thread 1b and thread 1c) based at least in part on the split write table sequence, to perform operations on partition P1 of the DB. As shown in FIG. 8, the pipeline technology can be used to schedule the three parallelized ETL threads, to further improve the operation performance of ETL. Since this process integrates the dual ETL parallelization solution, the ETL processing efficiency can be maximized in practice. It should be understood, entities illustrated herein, such as the DB scanner, the source data dispatcher, the ETL flow parser, the table sequence splitter, the ETL instance generator and the ETL instance scheduler, are merely illustrative and nonrestrictive descriptions of modules, means and/or devices capable of implementing process steps and corresponding functions according to an embodiment of the present invention, and in practical applications, more or less modules, means and/or devices can be used to implement the corresponding functions of these entities, or the functions of these entities can be further subdivided or combined.

Figure 9:
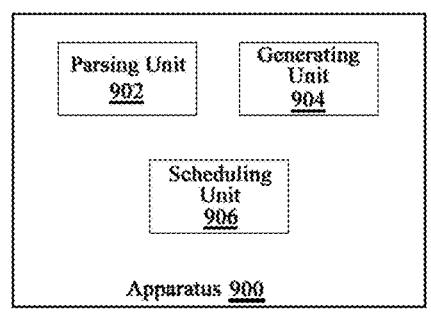
FIG. 9 is a block diagram of an apparatus for parallelization of data processing, according to an embodiment of the present invention.

FIG. 9 is a block diagram of an apparatus 900 for parallelization of data processing according to an embodiment of the present invention. The apparatus 900 includes components or units which can implement process steps and corresponding functions according to an embodiment of the present invention (as shown in combination with FIG. 2). As shown in FIG. 9, the apparatus 900 can include a parsing unit 902, a generating unit 904 and a scheduling unit 906. For example, the parsing unit 902 can be configured to parse a data processing flow to split a write table sequence of the data processing flow; the generating unit 904 can be configured to generate at least two instances of the data processing flow based at least in part on the split write table sequence; and the scheduling unit 906 can be configured to schedule the at least two instances for parallelization of data processing. According to an embodiment of the present invention, the apparatus 900 can further include: a scanning unit (not shown in FIG. 9), which can be configured to scan database partitions; and a dispatching unit (not shown in FIG. 9), which can be configured to dispatch a plurality of data processing subtasks of the data processing task to the database partitions based at least in part on the scanning result. The apparatus 900 can be deployed or integrated into a device or system for performing data processing operations such as ETL, so as to implement efficient parallelization of data processing according to exemplary embodiments of the present invention.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the Figures. For example, two blocks shown in succession can, in fact, be executed substantially in parallel, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for parallelization of data processing, the method comprising:
   parsing a data processing flow to split a write table sequence for the data processing flow, wherein the write table sequence is split into a plurality of segments, and neighboring segments indicate different database tables;
   generating a plurality of instances of the data processing flow based at least in part on the split write table sequence; and
   scheduling the plurality of instances for parallelization of data processing with pipeline technology.

2. The method according to claim 1, wherein the write table sequence is split according to an assemble structure of the write table sequence.

3. The method according to claim 1, wherein the plurality of instances perform write operations on different database tables at the same time.

4. The method according to claim 1, wherein the data processing comprises data extraction, transformation, and loading.

5. An apparatus for parallelization of data processing, the apparatus comprising:
   a memory;
   a processor device communicatively coupled to the memory; and
   a module configured for parallelization of data processing coupled to the memory and the processor device to carry out the steps of a method comprising:
   parsing a data processing flow to split a write table sequence for the data processing flow, wherein the write table sequence is split into a plurality of segments, and neighboring segments indicate different database tables;
   generating a plurality of instances of the data processing flow based at least in part on the split write table sequence; and
   scheduling the plurality of instances for parallelization of data processing with pipeline technology.

6. The apparatus according to claim 5, wherein the write table sequence is split according to an assemble structure of the write table sequence.

7. The apparatus according to claim 5, wherein the plurality of instances perform write operations on different database tables at the same time.

8. The apparatus according to claim 5, wherein the data processing comprises data extraction, transformation, and loading.

9. The apparatus according to claim 5, wherein the data processing flow comprises any one of a plurality of data processing subtasks executed in parallel.

10. The apparatus according to claim 9, further comprising:
    scanning database partitions; and
    dispatching the plurality of data processing subtasks of a data processing task to the database partitions based at least in part on the scanning result.

11. The apparatus according to claim 10, wherein said scanning the database partitions comprises:
    scanning a database partition key table to obtain database partition keys; and
    mapping the database partitions and the database partition keys to learn a number of the database partitions.

12. The apparatus according to claim 11, wherein said dispatching the plurality of data processing subtasks to the database partitions comprises:
    parallelizing the data processing task into the plurality of data processing subtasks based at least in part on the number of the database partitions;
    dispatching the plurality of data processing subtasks to corresponding database partitions; and
    executing the plurality of data processing subtasks in parallel.

* * * * *